INVENTOR.
ROBERT A. HALL
BY
Brumbaugh, Free, Graves & Donohue
his ATTORNEYS

Nov. 5, 1968     R. A. HALL     3,409,885
SMOKE DETECTION APPARATUS
Filed March 26, 1964     6 Sheets-Sheet 2
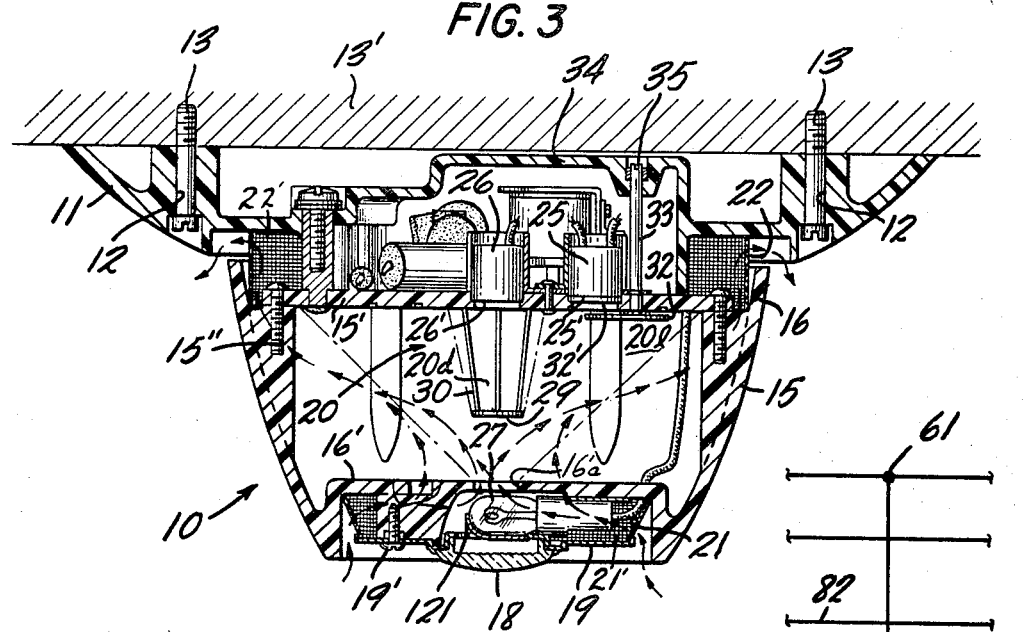
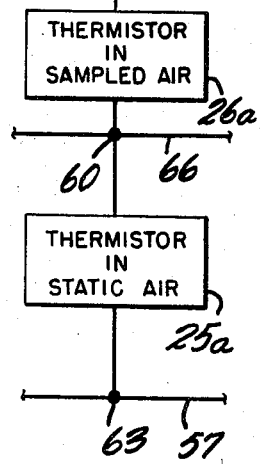
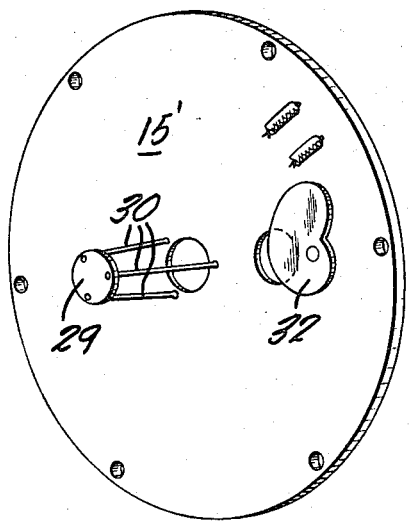
INVENTOR.
ROBERT A. HALL
BY
Brumbaugh, Free, Graves & Donohue
his ATTORNEYS Nov. 5, 1968   R. A. HALL   3,409,885
SMOKE DETECTION APPARATUS
Filed March 26, 1964   6 Sheets-Sheet 3
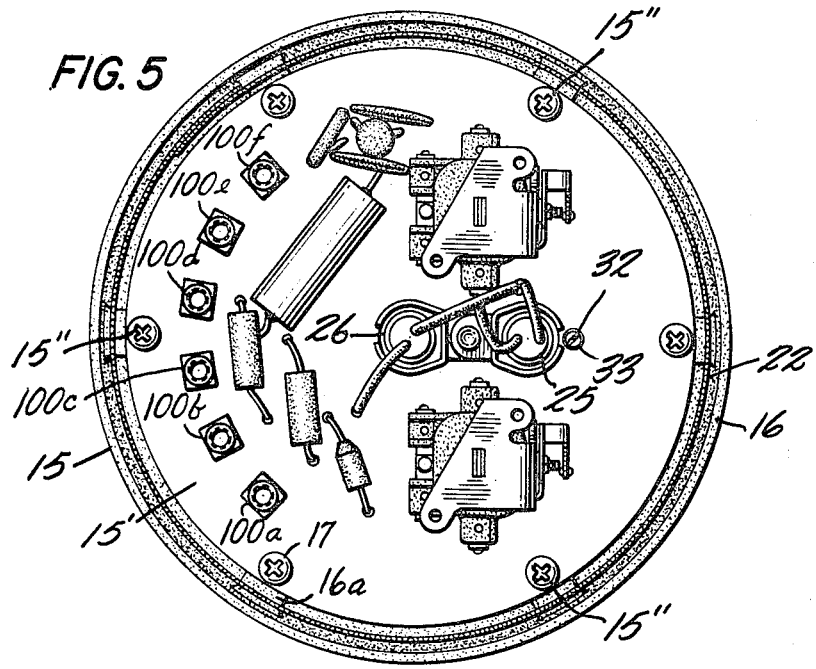
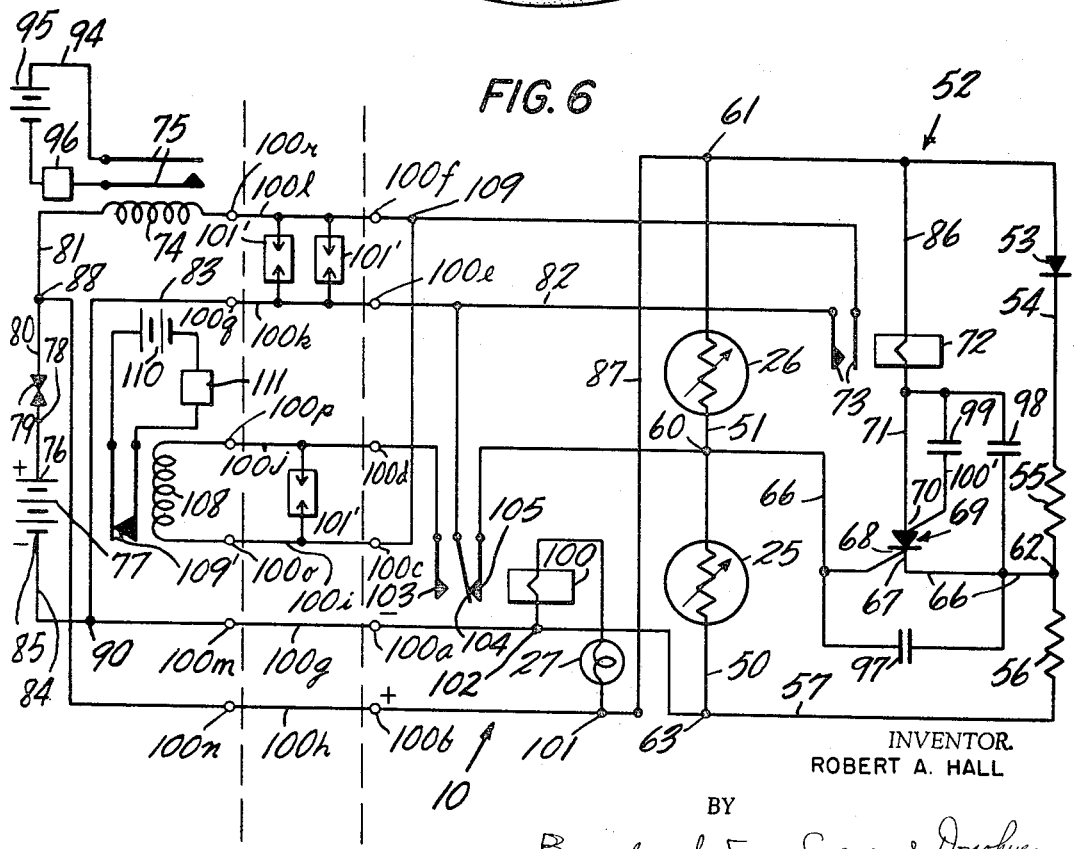
INVENTOR.
ROBERT A. HALL
BY
Brumbaugh, Free, Graves & Donohue
his ATTORNEYS

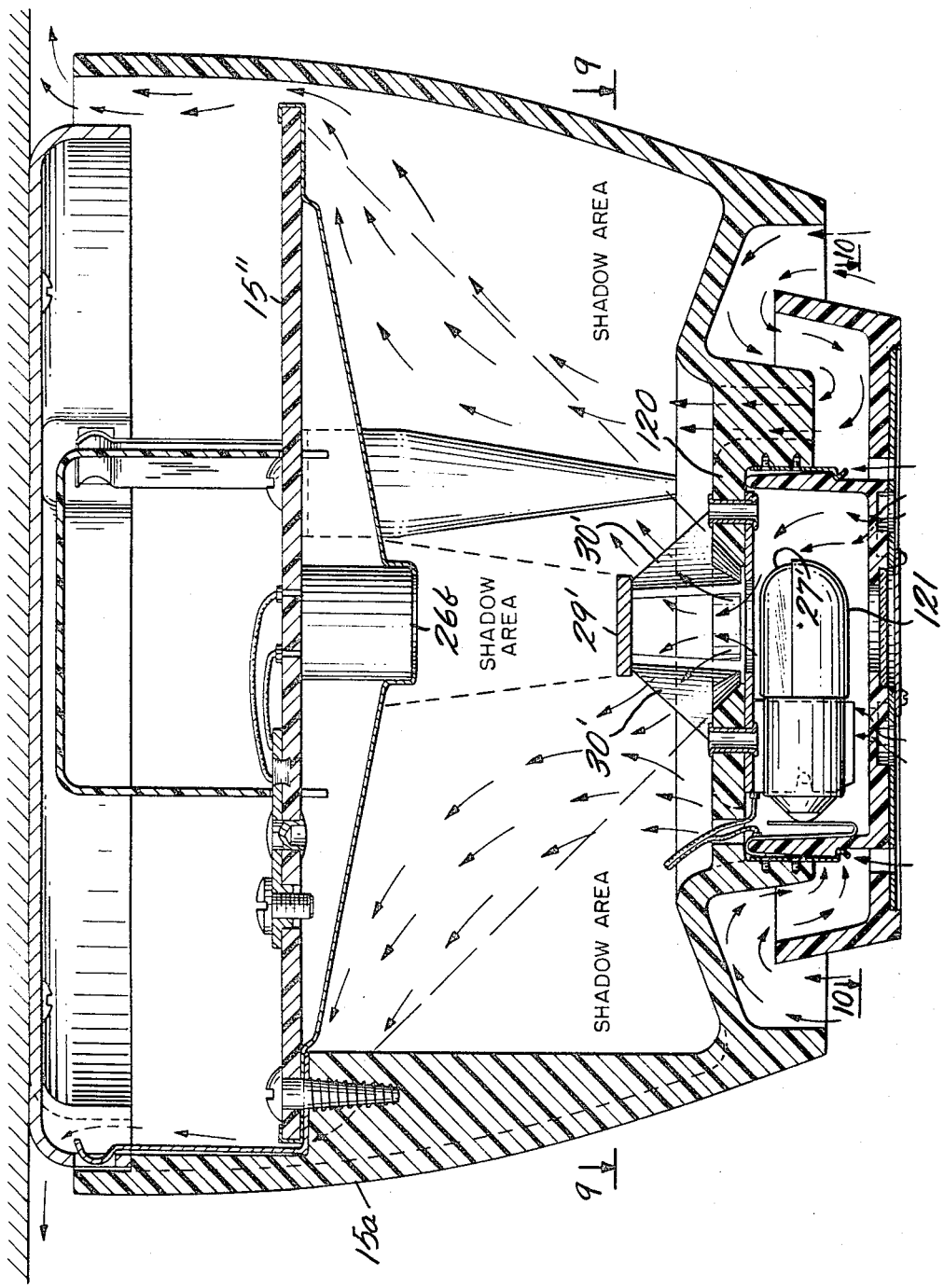

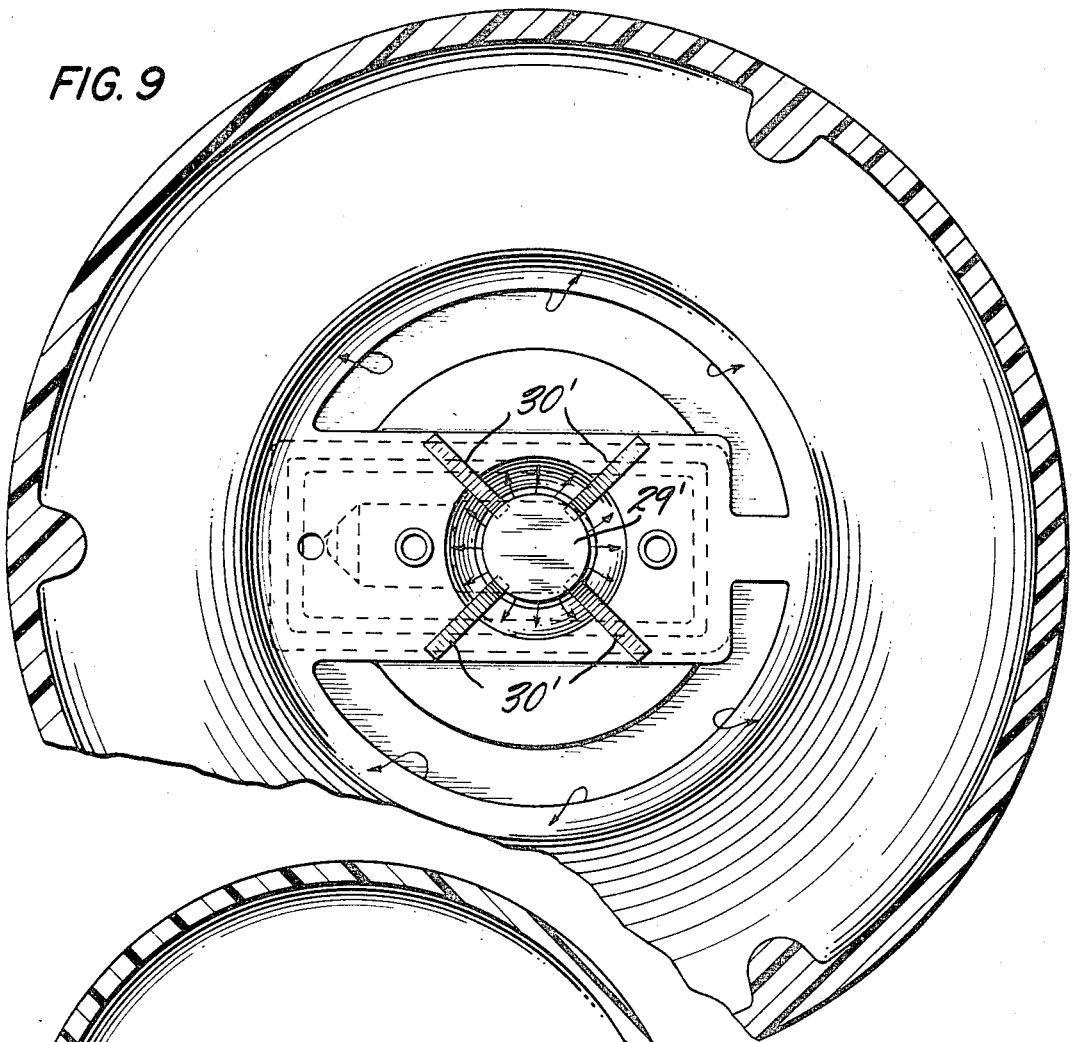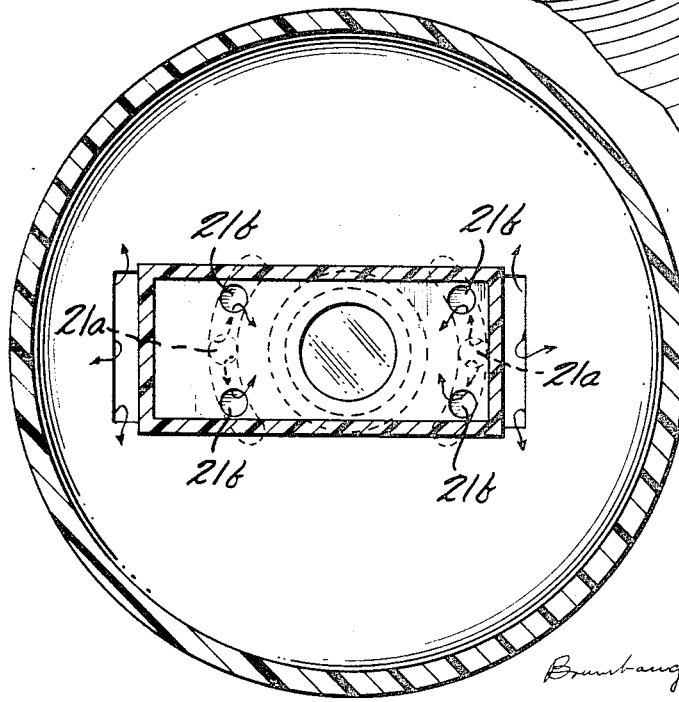

Nov. 5, 1968  R. A. HALL  3,409,885
SMOKE DETECTION APPARATUS
Filed March 26, 1964  6 Sheets-Sheet 6

INVENTOR.
ROBERT A. HALL
BY
Brumbaugh, Free, Graves & Donohue
his ATTORNEYS

United States Patent Office 3,409,885
Patented Nov. 5, 1968

3,409,885
SMOKE DETECTION APPARATUS
Robert A. Hall, Danbury, Conn., assignor, by mesne assignments, to Guardian Industries, Inc., Springfield, N.J., a corporation of New Jersey
Filed Mar. 26, 1964, Ser. No. 355,046
10 Claims. (Cl. 88—14)

ABSTRACT OF THE DISCLOSURE

A smoke detector is provided with a pair of photoelectric cells electrically connected in an offset bridge, one cell being mounted in a normally-dark region surrounded by a "wall of radiation" from a light source and the other cell being mounted so as to be irradiated by the light source. Smoke particles, if present in the detector, reflect light onto the normally-dark cell, and an electric switch connected to the cells actuates an alarm when the two cells are balanced. A filter and an adjustable shield facilitate adjustment of the light impinging on the normally-light cell so that the alarm is given at any predetermined smoke density. In one embodiment, thermistors are substituted for the photoelectric cells to produce a gas detector or temperature rate-of-rise or rate-of-drop detector.

---

This invention relates to detection apparatus and, more particularly, to apparatus for detecting the presence of smoke or other solids in suspension or a particular gas, whether or not in solution, or the rate of rise or rate of fall of the temperature of a transparent or translucent fluid such as a gas.

The timely and reliable detection of certain environmental conditions such as the presence of smoke is extremely important under many circumstances. Smoke or particles of ash from an uncontrolled fire in, say, a residential building may be relatively cool but lethal. Many persons killed by "fire" are in fact unburned, the victims of smoke inhalation.

Conventional apparatus for detecting the presence of smoke and the like has a number of serious disadvantages. For example, the sensitivity of such apparatus is typically dependent on the voltage employed in its operation. With fluctuations in voltage, which are sometimes unavoidable, particularly in the absence of expensive voltage-regulating equipment, the apparatus may, on the one hand, become hypersensitive or, on the other, fail to react to the presence of a substance such as smoke to be detected. Similarly, the sensitivity of conventional detection apparatus typically varies with temperature, with accumulation of dust and grease on lenses, reflecting surfaces, lamps, etc., and with aging of a tungsten filament or other element necessary to the operation of the apparatus.

Another disadvantage of many conventional detectors is that they fail to provide means for securing adequate, continuous, and representative samples of air to be tested for, say, smoke content. Further, many such detectors have the disadvantage that they sample for, say, smoke content only a part of the air that passes through the detector.

A principal object of the invention is to provide novel detection apparatus free of the above-noted disadvantages.

In particular, an object of the invention is to provide a detector which has a prescribed sensitivity irrespective, within wide limits, of changes in supply voltage, temperature, dust and grease accumulations, filament age, and similar conditions.

Another object of the invention is to provide a detector which secures at all times an adequate and representative sample of air to be tested and which samples for, say, smoke content all of the air that passes through the detector.

These and other objects of the invention are attained by providing, in an exemplary embodiment thereof, apparatus for detecting the occurrence of an event, the apparatus comprising first variable-electrical-property means having an electrical property variable as a first function of a set of conditions which may include the occurrence of the event to be detected and second variable-electrical-property means electrically connected to the first variable-electrical-property means and having an electrical property variable as a second function of the same set of conditions, the first and second functions being so related to each other that the electrical properties of the first and second variable-electrical-property means are related to each other in a prescribed manner upon the occurrence of the event to be detected.

Comparison means is electrically connected to the first and second variable-electrical-property means for comparing their variable electrical properties. A sensible-signal-generating means electrically connected to the comparison means generates a sensible signal in response to a predetermined indication of the comparison means. A chimney effect and aerodynamically-shaped openings may be provided for securing an adequate, continuous, and representative sample of air, and a light source to which the variable-electrical-property means are responsive may be so mounted as to radiate light throughout a portion of the enclosure necessarily occupied by the smoke en route from an entrance opening to an exit opening in the detector.

For an understanding of further aspects of the invention, reference is made to the following detailed description of several exemplary embodiments thereof and to the accompanying figures in the drawings, in which:

FIG. 3 is a sectional view taken generally along the line 3—3 of FIG. 1 and looking in the direction of the arrows;

FIG. 4 is a bottom perspective view of a portion of the apparatus of FIG. 1;

FIG. 5 is a top plan view of the apparatus of FIG. 1 with a portion thereof removed;

FIG. 6 is a schematic of an exemplary embodiment of an electric circuit constructed in accordance with the invention and particularly adapted for use in the apparatus of FIGS. 1–5;

FIG. 7 is a fragmentary schematic of a modification of a portion of the schematic of FIG. 6;

FIG. 8 is a sectional view in elevation of a second exemplary embodiment of apparatus constructed in accordance with the invention;

FIG. 9 is a sectional view taken generally along the line 9—9 of FIG. 8 and looking in the direction of the arrows;

FIG. 10 is a sectional view taken generally along the line 10—10 of FIG. 8 and looking in the direction of the arrows.

While the invention has many applications, it will be described first as it relates to the detection of smoke.

Figure 1:
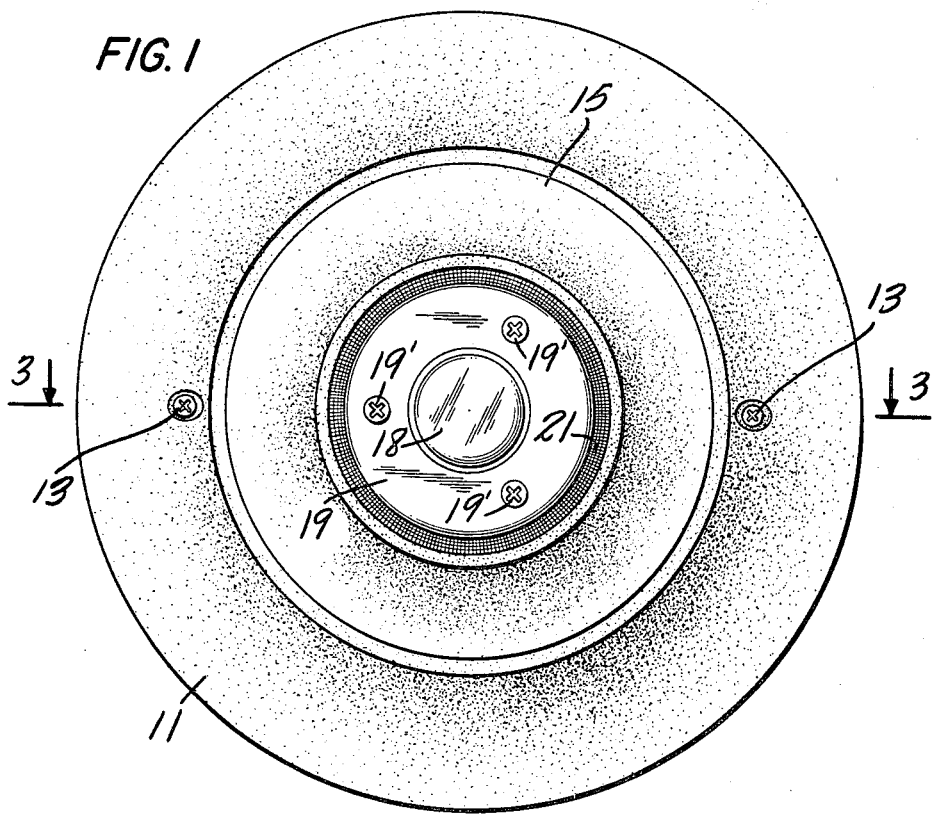
FIGURE 1 is a bottom plan view of an exemplary embodiment of apparatus constructed in accordance with the invention.
Figure 2:
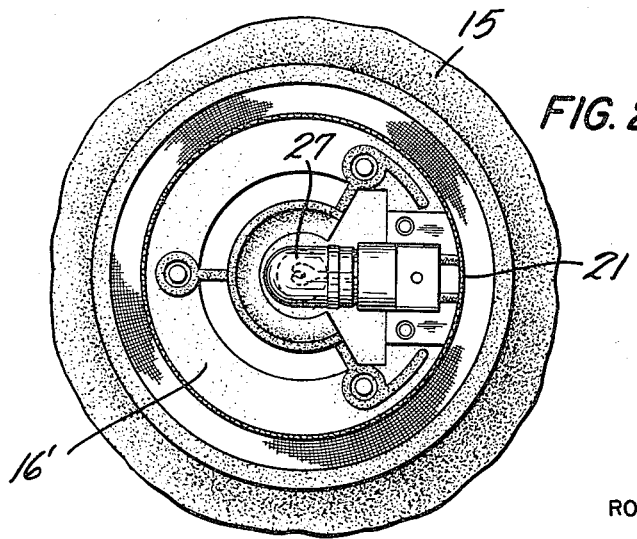
FIG. 2 is a bottom plan view of the apparatus of FIG. 1 with a portion thereof removed.

FIGS. 1 and 3 show exemplary detection apparatus 10 constructed in accordance with the invention. The apparatus 10 comprises a substantially opaque mount 11 provided with apertures 12 adapted to receive fastening means such as screws 13 for securing the mount 11 to a support such as the ceiling 13' of a room within which the apparatus 10 is to be mounted. A substantially opaque pendent portion 15 of the detection apparatus 10 is provided near its upper periphery 16 with inwardly-extending projections 16a (FIG. 5) formed with threaded holes (not shown) in which fastening means such as screws 17 may be threadedly engaged for securing the pendent portion 15 to the mount 11. The portion of the mount 11 through which the screws 17 pass is omitted in FIG. 5 for clarity. A transparent or translucent member 18 is mounted in a lower plate 19 which is attached by fastening means such as screws 19' to the lower end 16' of the pendent portion 15. The member 18 permits visual inspection of the apparatus 10 to see whether a lamp 27 referred to hereinafter is in working order.

The mount 11 and pendent portion 15 constitute a housing defining an enclosure 20 formed with one or more lower openings 21 and one or more upper openings 22 which provide, respectively, for the passage of air into and the passage of air out of the enclosure 20. The enclosure 20 and openings 21 and 22 are aerodynamically shaped to facilitate free and continuous flow of air therethrough from the opening 21 to the opening 22 irrespective of the direction and speed of air flow in the vicinity of the apparatus 10. The openings 21 and 22 are, however, labyrinthine and have black, light-absorbent surfaces, so that the enclosure 20 is substantially light tight. Insect-excluding screens 21' and 22' are provided in the openings 21 and 22 for the purpose of excluding insects which might be attracted by the lamp 27.

The air passing through the enclosure 20 may of course carry with it smoke or particles of ash, etc. The apparatus 10, when functioning as a smoke detector, is adapted to detect the presence of such smoke or particles of ash in a novel and highly efficient manner. To this end, a first variable-electrical-property means such as a first photoelectric cell 25 and a second variable-electrical-property means such as a second photoelectric cell 26 are mounted within the enclosure 20 on a base plate 15', their respective photosensitive surfaces 25' and 26' being exposed to the interior of the enclosure 20. The photoelectric cells 25, 26 preferably comprise the same material to assure that their aging characteristics are the same. The base plate 15' is in turn secured by any suitable means such as screws 15" (FIGS. 3 and 5) to the pendent portion 15. A source of electromagnetic radiation such as a lamp 27 is mounted within the enclosure 20 in the lower end 16' of the pendent portion 15, and heat therefrom warms the air within the enclosure 20 and further facilitates circulation of air by chimney effect into the enclosure 20 via the openings 21, upwardly through the enclosure 20, and out of the enclosure 20 via the openings 22.

Figure 11:
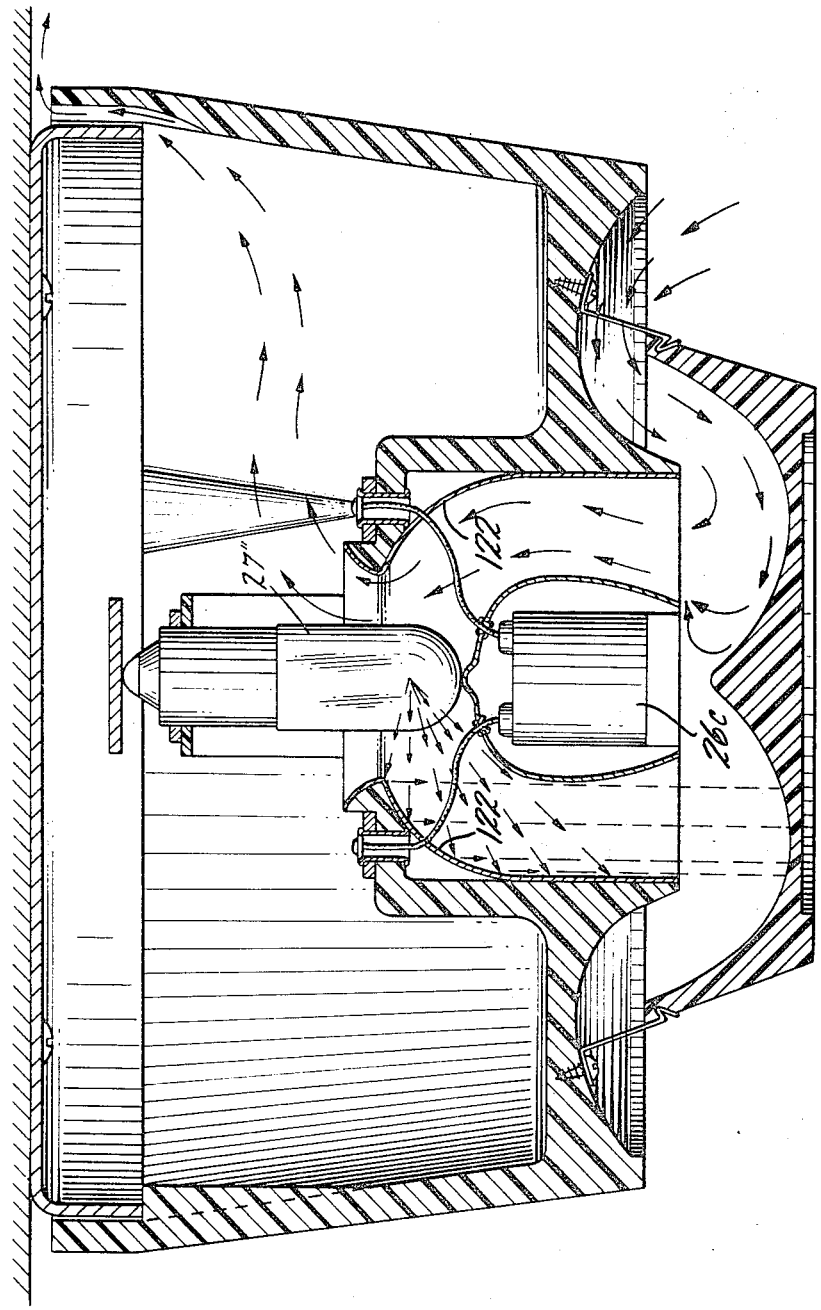
FIG. 11 is a sectional view in elevation of another exemplary embodiment of apparatus constructed in accordance with the invention.

The spatial relationship between the photoelectric cells 25 and 26, the lamp 27, and other structure to be described is such that the photoelectric cell 25 is normally light and the photoelectric cell 26 is normally dark. The relationship is further such that the photoelectric cell 26 is substantially surrounded by a "wall of light" which may be generally conical (FIGS. 1–5 and 8–10) or cylindrical (FIG. 11). In the particular arrangement shown in FIGS. 3 and 4, shield means 29 aligned with and spaced apart from the photoelectric cell 26 intercepts the light emanating from the lamp 27 and passing through an aperture 16'a formed in the end portion 16' and towards the cell 26. There results a region 20d of darkness in which the cell 26 is mounted substantially surrounded by a region 20l of light in which the cell 25 is mounted. The shield means 29 is supported by legs 30 attached to the base plate 15'. Except for the photosensitive surface 25', all of the surfaces exposed to direct radiation from the lamp 27, such as the shield means 29 and the interior surfaces of the enclosure 20, and surfaces in line-of-sight relation with the cell 26 are black and light-absorbent, so that, in the absence of smoke, virtually no light is reflected onto the photoelectric cell 26.

Thus, the resistance of the cell 25 varies as a first function of a set of conditions such as applied voltage and the amount of smoke, if any, present, and the resistance of the cell 26 varies as a second function of the same set of conditions. It is to be noted that the set of conditions referred to may include the occurrence of the event to be detected, namely the presence of critical amount of smoke. The first and second functions referred to are so related to each other that the resistances of the cells 25, 26 are related to each other in a prescribed manner upon the occurrence of the event to be detected, as will presently appear.

An adjustable shield means 32 (FIGS. 3 and 4) is secured to the base plate 15'. The shield 32 can be pivoted with respect to the base plate 15' by means of a control piece 33 rigidly connected to the shield 32 and extending rotatably through the base plate 15' and the top portion 34 of the mount 11. The control piece 33 may have a slotted end 35 for engagement by a tool such as a screwdriver by means of which the control piece 33 can be rotated or turned to adjust the shield 32 and thereby control the amount of light incident upon the photosensitive surface 25'. A partial shield means such as a filter 32' may also be provided if necessary to maintain the illumination of the photoelectric cell 25 within acceptable limits. The sensitivity of the apparatus 10 can thus be adjusted after the apparatus 10 is assembled, and the sensitivity maintained even in a corrosive environment.

Thus, in a normal or no-smoke condition, the photoelectric cell 25 is illuminated to a degree by the lamp 27, and the photoelectric cell 26 is in virtual darkness. When, however, smoke-bearing air passes through the enclosure 20, it must pass through the "wall of light" referred to above en route from the openings 21 to the openings 22 through the enclosure 20, and light reflected from the smoke particles illuminates the photosensitive surface 26' of the photoelectric cell 26, which then is no longer in darkness. If the average smoke density in the vicinity of the cells 25 and 26 is sufficiently great, the illumination of the photoelectric cell 26 becomes as great as the illumination of the photoelectric cell 25. Inasmuch as the distance between the lamp and the photoelectric cells is normally not great, the equality between the illumination of the cell 25 and the illumination of the cell 26 is due almost entirely to the reflection of light from the smoke particles onto the cell 26 and very little to the attenuation of the light incident upon the photoelectric cell 25 by the smoke particles.

When the illumination of the photoelectric cell 26 is equal to the illumination of the photoelectric cell 25 or compares in some other predetermined way with the illumination of the photoelectric cell 25, such comparison being indicative of a predetermined average smoke density in the vicinity of the photoelectric cells 25, 26, a sensible signal is generated by electric circuitry shown in FIG. 6. It is preferred that the signal be generated when the cells 25, 26 have equal resistances, because in such case the cells 25, 26 are illuminated to the same degree and have identical temperature characteristics.

In FIG. 6, the convention is adopted that all relay contacts are shown in the position, open or closed, that the contacts occupy in the absence of energizing current through their governing relay coils. As FIG. 6 shows, the normally-light and normally-dark photoelectric cells 25 and 26, which may be of the photoresistive type, are mounted respectively in first and second adjacent legs 50 and 51 of an electric bridge circuit designated generally by the reference numeral 52. The cells 25 and 26 are thus, respectively, first and second resistors having resistances variable as a function of the light incident upon them. A forward-biased silicon diode 53 mounted in a third leg 54 of the bridge 52 and having a substantially constant voltage drop thereacross for wide variations in current therethrough constitutes a third resistor in the bridge 52. A fourth resistor 55 is mounted in the same leg 54. A fifth resistor 56 is mounted in the fourth leg 57 of the bridge 52.

The cells 25 and 26 constitute a first voltage divider dividing a voltage impressed thereacross as a function of the light incident upon the respective cells 25 and 26, and the resistors 55 and 56 constitute a second voltage divider dividing a voltage impressed thereacross in a prescribed ratio. The bridge 52 is, however, offset by the diode 53, so that the voltage divided by the resistors 55, 56 is less than the voltage divided by the cells 25, 26 by a substantially constant amount.

To continue the description of the offset bridge 52, the first leg 50 and second leg 51 of the bridge 52 meet in a first junction 60; the second leg 51 and the third leg 54 of the bridge 52 meet in a second junction 61; the third leg 54 and the fourth leg 57 of the bridge 52 meet in a third junction 62; and the fourth leg 57 and the first leg 50 of the bridge 52 meet in a fourth junction 63.

A center leg 66 of the bridge 52 extends from the junction 60, where it taps the first voltage divider, to the junction 62, where it taps the second voltage divider, and includes a cathode 67 and a cathode gate 68 of a silicon controlled switch 69 having an anode 70 in operative association with the cathode 67 and the cathode gate 68. The switch 69 and diode 53 may be solid-state devices selected to comprise the same material and have corresponding variations of their characteristics as functions of temperature, so that the response of the circuit of FIG. 6 is the same regardless, within wide limits, of changes in temperature, as will presently appear.

The anode 70 is electrically connected by a line 71 to a relay coil 72 governing normally-open contacts 73 and through it to a positive terminal 76 of a source 77 of direct current. Energization of the coil 72 closes the contacts 73, thereby to energize a relay coil 74 through a circuit including the positive terminal 76 of the direct-current source 77, a line 78, a momentary break switch 79, a line 80, a line 81, the coil 74, the contacts 73, lines 82, 83, and 84, the negative terminal 85 of the source 77 of direct current, and the source 77 of direct current.

The silicon controlled switch 69 does not fire, however, to energize the coil 72 and by means of it the coil 74 unless the potential or voltage of the cathode gate 68 is higher than the potential or voltage of the cathode 67 by a prescribed amount, +0.4 volts for example. The circuitry shown in FIG. 6 assures that the cathode gate 68 is at a potential substantially 0.4 volt above the potential of the cathode when and only when the resistance of the cell 26 compares in a predetermined way with the resistance of the cell 25, and hence when and only when the intensity of illumination of the cell 26 compares in a predetermined way with the intensity of illumination of the cell 25.

In a preferred embodiment of the invention, the values of the fixed resistances of the resistors 55 and 56 are chosen to be equal, and the resistance of the forward-biased silicon diode 53 is variable so that the potential drop across the diode equals 0.8 volt regardless, within wide limits, of the current through the diode 53. In such case, the silicon controlled switch 69 fires whenever the photoelectric cells 25 and 26 have equal resistances, regardless, within wide limits, of fluctuations in the source of supply voltage 77. The resistors 53, 55 and 56 and switch 69 are thus a comparison means for comparing the resistances of the resistors 25 and 26.

A specific illustration of the operation of the apparatus 10 will make clear the relationships set forth above. In the absence of smoke in the enclosure 20 (FIGS. 1–5), the normally-light photoelectric cell 25 conducts freely and the normally-dark photoelectric cell 26 conducts substantially not at all. Inasmuch as the photoelectric cells 25 and 26 constitute a first voltage divider extending between the high-voltage junction 61 and the low-voltage junction 63, substantially all of the voltage drop occurs across the photoelectric cell 26 and substantially none of it across the photoelectric cell 25. The junction 60 and the cathode gate 68 are therefore at a potential substantially the same as the potential of the low-voltage junction 63 and well below the potential of the cathode 67, which is at the potential of the junction 62. The latter junction 62 has a potential half-way between that of the junction 63 and the portion of the line 54 between the diode 53 and the resistor 55, inasmuch as the resistors 55 and 56 have, in the preferred embodiment, equal resistances. As noted above, the resistors 55 and 56 constitute a second voltage divider for dividing the voltage between the portion of the line 54 between the diode 53 and the resistor 55 and the low-voltage junction 63 in a prescribed ratio. The second voltage divider is offset with respect to the first by the silicon diode 53, which has a substantially constant voltage drop thereacross for wide variations of current therethrough.

Accordingly, where the fixed resistances of the resistors 55 and 56 are chosen equal and the variable resistances of the photoelectric cells 25 and 26 are also equal, because the cells are illuminated to the same degree, the potential of the junction 60 and the cathode gate 68 is half-way between the potentials of the junctions 63 and 61, and the potential of the junction 62 and the cathode 67 is half-way between the potentials of the junction 63 and the portion of the line 54 between the diode 53 and the resistor 55. The second voltage divider constituted by the resistors 55 and 56 thus divides a voltage which is smaller than the voltage divided by the first voltage divider constituted by the photoelectric cells 25 and 26 by an amount equal to the voltage drop across the diode 53. The voltage drop across the diode 53 is constant, within wide limits, despite variations in the supply voltage to the bridge 52. Therefore, under the given conditions, the potential of the junction 62 and the cathode 67 is less than the potential of the junction 60 and the cathode gate 68 by exactly half of the potential drop across the silicon diode 53.

Then, if the potential drop across the silicon diode 53 is, say, 0.8 volt, the potential difference between the cathode gate 68 and the cathode 67 is exactly 0.4 volt, which is the amount required to fire the silicon controlled switch 69. On the other hand, if because of a change in temperature the potential drop across the diode 53 is, say, 0.9 volt, the corresponding temperature dependence of the switch 69 is such that it does not fire unless there is a potential difference between the cathode gate 68 and the cathode 67 of 0.45 volt, which, again, occurs only when the cells 25, 26 are illuminated to the same degree. At any temperature and voltage, therefore, within wide limits, illumination of the cells 25, 26 to the same degree establishes a first electric circuit condition, namely the division into two equal parts of the voltage between the junctions 61, 63, indicative of the presence of a predetermined level of smoke in the vicinity of the cells 25, 26. Further, the two voltage dividers 25, 26 and 55, 56 together establish a second electric circuit condition, namely maintenance of a potential difference between the cathode gate 68 and the cathode 67 sufficient to fire the switch 69.

Firing of the silicon controlled switch 69 completes a circuit from the negative terminal 85 through the line 84, the junction 63, the line 57, the resistor 56, the junction 62, the line 66, the cathode 67, the anode 70, the relay coil 72, the line 87, the line 80, the switch 79, the line 78, the terminal 76, the source of direct current 77, and the terminal 85.

The resulting current through the relay coil 72 energizes the contacts 73, reversing them from the position shown in the drawings so that the contacts 73 are closed. Closing of the contacts 73 completes a circuit from the terminal 85 through the line 84, a junction 90, the line 83, the line 82, the contacts 73, the relay coil 74, the lines 81 and 80, the switch 79, the line 78, the terminal 76, the source of direct current 77, and the terminal 85.

The resulting current through the coil 74 reverses normally-open contacts 75, completing a circuit through the contacts 75, a line 94, a source of current 95, and a sensible-signal generator 96. The generator 96 generates a sensible signal such as a sound or a light to apprise a monitoring machine or a human operator of the presence of smoke.

The invention also includes trouble signal and sensible-signal-generating-inhibiting means. A relay coil 100 is in series with the lamp 27 between positive and negative terminals 101 and 102. So long as the lamp 27 is in operating order, a current exists through it and the coil 100, and contacts 103, 104, 105 are in a position the reverse of that shown in FIG. 6. That is, the contacts 103, 104 are closed, and the contacts 104, 105 are open.

When the lamp 27 is in operating order, therefore, a circuit is completed from the junction 90, a low-voltage junction, through the line 83, the contacts 103, 104, a coil 108, a junction 109, and the coil 74 to the junction 88, a high-voltage junction. The thus-energized coil 108 maintains normally-closed contacts 109' in an open position. It is to be noted that, although there is in such case a current through the coil 74, the total resistance of the circuit 77, 90, 83, 103, 104, 108, 109, 74, 88 is such that the current is insufficient to energize the coil.

Upon failure of the lamp 27, current through it and the coil 100 is interrupted, so that the contacts 103, 104, 105 return to their position shown in FIG. 6. Opening of the contacts 103, 104 interrupts the current through the coil 108, so that contacts 109 governed thereby return to their position shown in FIG. 6. Closing of the contacts 109 completes a circuit through the contacts 109', a source of current 110, and a trouble signal 111. Actuation of the trouble signal apprises a monitoring machine or human operator of failure of the lamp 27, which can then promptly be replaced with a lamp in working order. The trouble signal supplements the inspection referred to above in connection with the translucent or transparent cover 18.

Upon failure of the lamp 27, not only do the contacts 103, 104 open, with the effect described in the preceding paragraph, but also the contacts 104, 105 close. The negative terminal 85 is thus connected, via the junction 90, the contacts 104, 105, and the line 66, directly to the cathode gate 68, maintaining the potential of the cathode gate 68 at a value well below the potential of the cathode 67, so that the silicon controlled switch 69 cannot fire even if the resistances of the cells 25, 26 become equal as both approach the dark state. Thus, upon failure of the lamp 27, the trouble signal 111, but not the smoke alarm 96, is actuated.

A number of capacitors may be employed to prevent accidental actuation of the silicon controlled switch 69 by AC transients. In the arrangement shown in FIG. 10, a capacitor 97 is connected to the line 66 in shunt with the cathode 67 and cathode gate 68; a capacitor 98 is connected between the cathode 67 and anode 70 in shunt with the silicon controlled switch 69; and a capacitor 99 is connected between an otherwise electrically open anode gate 100 and the anode 70.

The part of the electric circuitry housed in the apparatus 10 terminates in terminals 100a, 100b, 100c, 100d, 100e, 100f. Leads 100g, 100h, 100i, 100j, 100k, 100l extend, respectively, between the terminals 100a–100f and terminals 100m, 100n, 100o, 100p, 100q, 100r, which may be at a location remote from the apparatus 10. Thermostats 101 may be mounted in the leads 100i, 100j and the leads 100k, 100l, to supplement the circuitry described above.

The circuitry described above lends itself to conversion to a novel gas detector. This is accomplished by replacing the photoelectric cells 25 and 26 shown in FIG. 6 with thermistors 25a and 26a shown in FIG. 7. The relation of the power supply voltage to the thermistor resistances is such as to provide sufficient current through the thermistors 25a, 26a to heat them to a level somewhat above the expected ambient temperature of the air. The thermistor 25a is exposed to static air and serves as a reference thermistor. The thermistor 26a is exposed to air to be sampled. A differential resistance occurs when the thermistor exposed to the sampled air is in the presence of a gas having a thermal resistivity differing from that of the static air. Proper selection of the values of the circuit components causes the silicon controlled switch 69 to fire when the sampled gas contains the gas to be detected.

In the absence of a biasing current through the thermistors 25a, 26a sufficient to heat them to a temperature greater than that of the ambient air, the circuitry of FIG. 7 constitutes a rate-of-rise or rate-of-drop detector. Then, if the temperature of the thermistor 26a in the sampled air changes owing to a change in the temperature of the sampled air, the difference in the resistances of the thermistors 25a and 26a causes actuation of the silicon controlled switch 69 in accordance with the principles set forth above.

FIGURES 8–11 illustrate embodiments of the invention alternate to that of FIGS. 1–5.

In FIGS. 8–10, the "wall of light" is generally conical, as in FIGS. 1–5, but the light shield means 29' for shielding the photoelectric cell 26b is mounted by four legs 30' on the lower portion 120 of the pendent portion 15a instead of on the base plate 15''. Also, offset holes 21a and 21b are provided for admitting air but not light. As in the embodiment of FIGS. 1–5, a reflector 121 around the lower portion of the lamp 120 reduces the intensity of the light directed downwardly and increases the intensity of the light directed upwardly.

In FIG. 11, the "wall of light" is generally cylindrical, the surface 122 being reflective. The lamp 27'' is disposed above the photoelectric cell 26c. The cell 26c faces downwardly as in the other embodiments to minimize the settling of dust on the photosensitive surface.

Thus there is provided in accordance with the invention novel and highly effective apparatus for detecting the presence of smoke or a particular gas or the rate of rise or rate of fall of the temperature of a gas. Within the spirit and scope of the invention, many modifications of the embodiments disclosed herein will occur to those skilled in the art. For example, a radioactive source and first and second variable electric property means responsive thereto could be employed in place of the lamp 27 and photoelectric cells 25, 26.

Accordingly, the invention is to be construed as including all of the modifications which come within the scope of the following claims.

I claim:

1. A smoke detector comprising a light-tight enclosure formed with at least two openings therein to permit air to flow into and out of said enclosure, first radiation-responsive means mounted within said enclosure for producing a variable electrical output which is a function of the intensity of radiation incident thereon, second radiation-responsive means mounted within said enclosure for producing a variable electrical output which is a function of the intensity of radiation incident thereon, radiation means for normally irradiating said first radiation-responsive means, and second radiation-responsive means being normally unirradiated by said radiation means but being irradiable to a degree substantially equal to the degree of irradiation of said first radiation-responsive means upon the presence of a predetermined amount of smoke in said enclosure, electric-switch means electrically connected to said first and second radiation-responsive means and actuated upon the irradiation of said second radiation-responsive means to a degree substantially equal to the degree of irradiation of said first radiation-responsive means, and sensible-signal-generating means electrically connected to said electric-switch means and actuated by said electric-switch means to produce a sensible signal.

2. A smoke detector according to claim 1 wherein said first and second radiation-responsive means are first and second photoelectric cells, respectively, and said radiation means is a light source.

3. A smoke detector according to claim 1 wherein a given portion of said enclosure is necessarily occupied for a time by every particle of smoke en route within said enclosure from one to the other of said openings and said radiation means is mounted to irradiate said smoke in said given portion of said enclosure.

4. A smoke detector according to claim 1 wherein said openings are at different elevations, one above and one below said radiation means, and said radiation means comprises means which warms air within said enclosure to establish convection drawing ambient air into said enclosure through the lower of said openings by chimney effect.

5. A smoke detector according to claim 1 in which said first and second radiation-responsive means are first and second photoelectric cells, respectively, said cells being mounted in face-down relation to inhibit interference with the operation thereof by the settling of dust thereon.

6. A smoke detector according to claim 1 in which said first and second radiation-responsive means are first and second photoelectric cells, respectively, and said radiation means is a light source, further comprising illumination-reducing means mounted adjacent to said first photoelectric cell for reducing the illumination of said first photoelectric cell by said light source.

7. A smoke detector according to claim 6 in which said illumination-reducing means comprises a filter and a movable shield.

8. A smoke detector according to claim 1 further comprising sensible-signal-inhibiting means electrically connected to said electric-switch means and responsive to failure of said radiation means for inhibiting generation of a sensibe signal by said sensible-signal-generating means.

9. A smoke detector according to claim 1 further comprising radiation-shielding means mounted within said enclosure for normally shielding said second radiation-responsive means from radiation from said radiation means.

10. A smoke detector according to claim 1 in which said radiation means projects a wall of radiation substantially surrounding said second radiation-responsive means.

References Cited

UNITED STATES PATENTS

| | | |
|---|---|---|
| 2,877,453 | 3/1959 | Mendenhall. |
| 3,019,692 | 2/1962 | Skala. |
| 3,060,747 | 10/1962 | Dunham. |
| 3,147,465 | 9/1964 | Brown et al. _____ 340—237 |
| 3,231,748 | 1/1966 | Hagssler et al. |
| 3,240,109 | 3/1966 | Grant. |
| 3,328,587 | 6/1967 | Brown et al. |
| 2,537,028 | 1/1951 | Cahusac et al. _____ 250—218 |
| 3,255,441 | 6/1966 | Goodwin et al. _____ 88—14 |
| 3,312,826 | 4/1967 | Finkle _____ 88—14 |

JEWELL H. PEDERSEN, *Primary Examiner.*

W. A. SKLAR, *Assistant Examiner.*